(12) United States Patent
Wang et al.

(10) Patent No.: US 9,773,299 B2
(45) Date of Patent: Sep. 26, 2017

(54) METHOD FOR CORRECTING FRAGMENTARY OR DEFORMED QUADRANGULAR IMAGE

(71) Applicant: GRG Banking Equipment Co., Ltd., Guangzhou, Guangdong (CN)

(72) Inventors: Qianwen Wang, Guangdong (CN); Jing You, Guangdong (CN); Jing Xu, Guangdong (CN); Dehao Xie, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/104,334

(22) PCT Filed: Oct. 13, 2014

(86) PCT No.: PCT/CN2014/088484
§ 371 (c)(1),
(2) Date: Jun. 14, 2016

(87) PCT Pub. No.: WO2015/096535
PCT Pub. Date: Jul. 2, 2015

(65) Prior Publication Data
US 2016/0314563 A1 Oct. 27, 2016

(30) Foreign Application Priority Data
Dec. 25, 2013 (CN) .......................... 2013 1 0733877

(51) Int. Cl.
*G06K 9/03* (2006.01)
*G06T 5/00* (2006.01)
(Continued)

(52) U.S. Cl.
CPC ............ *G06T 5/006* (2013.01); *G06T 3/0093* (2013.01); *G06T 7/12* (2017.01)

(58) Field of Classification Search
CPC ..... G06T 5/006; G06T 7/0085; G06T 3/0093; G06T 7/12
(Continued)

(56) References Cited

U.S. PATENT DOCUMENTS 6,111,993 A 8/2000 Matsunaga
6,111,996 A 8/2000 Thompson
(Continued)

FOREIGN PATENT DOCUMENTS

CN 102222229 A 10/2011
CN 102521806 A 6/2012
(Continued)

OTHER PUBLICATIONS

European Search Report for 14875817.0-1906/3089103, mailed Dec. 8, 2016.
(Continued)

*Primary Examiner* — Ruiping Li
(74) *Attorney, Agent, or Firm* — Yue Xu; U.S. Fairsky LLP

(57) ABSTRACT

The present invention relates to a method for correcting a fragmentary or deformed quadrangular image. The method comprises five steps, i.e. detection of an edge point, elimination of an abnormal edge point, straight-line fitting, vertex calculation and image correction. The method for correcting a fragmentary or deformed quadrangular image is applied to a recognition method and a recognition system for papers, such as valuable documents, bills, identity cards, etc., and can rapidly conduct edge detection and tilt correction on images of valuable documents, bills or papers which are fragmentary or deformed.

9 Claims, 3 Drawing Sheets

(51) Int. Cl.
*G06T 3/00* (2006.01)
*G06T 7/12* (2017.01)

(58) Field of Classification Search
USPC .......................................................... 382/309
See application file for complete search history.

(56) References Cited

U.S. PATENT DOCUMENTS

| | | | |
|---|---|---|---|
| 6,433,896 | B1 | 8/2002 | Ueda et al. |
| 2008/0240615 | A1* | 10/2008 | Yamazaki .......... G06K 9/00248 382/287 |
| 2008/0285878 | A1* | 11/2008 | Morichika ............. H04N 1/195 382/254 |
| 2013/0182002 | A1 | 7/2013 | Macciola et al. |

FOREIGN PATENT DOCUMENTS

| | | |
|---|---|---|
| CN | 103679638 A | 3/2014 |
| EP | 1591944 A1 | 11/2005 |

OTHER PUBLICATIONS

Image Recognition and Defect Detection in Paper Currency Sorter, Chinses Master's Theses Full-text Database, 2009 col. 3, Feb. 16, 2009-Mar. 15, 2009, Bingtao Jin.

Spatial Correction of the Distorted License Plate Image of Automobiles, Journal of Southwest Jiaotong University, vol. 37 No. 4 Aug. 2002, Yongjie Hao, Wenyao Liu, Shuo Lu, pp. 417-420.

International Search Report for PCT/CN2014/088484, mailed Jan. 14, 2015, ISA/CN.

The First Chile Office Action for A-2017-28806, dated May 24, 2017.

\* cited by examiner

METHOD FOR CORRECTING FRAGMENTARY OR DEFORMED QUADRANGULAR IMAGE

CROSS REFERENCE OF RELATED APPLICATION

This application is a National Stage application of PCT international application PCT/CN2014/088484, filed on Oct. 13, 2014 which claims the priority to Chinese Patent Application No. 201310733877.7, titled "METHOD FOR CORRECTING FRAGMENTARY OR DEFORMED QUADRANGULAR IMAGE" and filed with the Chinese State Intellectual Property Office on Dec. 25, 2013, both of which are incorporated herein by reference in their entireties.

FIELD

The present disclosure relates to an identification technology for an image of valuable documents, bills or papers, and particularly to an edge detection and correction method for a quadrangular image of valuable documents such as banknote in financial field, bills such as car ticket, or papers such as identity card.

BACKGROUND

Since tilt of position and deformation in moving typically occur for identification means for valuable documents, bills and papers during the process of placing them or high-speed movement, an image generated is often a tilted or deformed image. When a collected image is identified, firstly, an edge detection and a tilt correction are often performed on the collected image, and the content of the image after the tilt correction is further identified. Therefore, the edge detection and the tilt correction are important subjects in designing an identification system for valuable documents, bills or papers.

In the process of edge detection and tilt correction, an image of valuable documents, bills or papers has the following characteristics.

1. The shape is quadrangle, but four edges may often be fragmentary, and it is the edges with no fragmentary defects of the valuable documents, the bills or the papers that are required to be obtained.

2. The identification means has high demands on identification time and storage space. For example, a common Deposit and withdrawal machine processes a valuable medium at a very fast speed. Many identification items, for example, valuable document type identification, valuable document prefix number identification, valuable document authenticity identification and valuable document sorting identification or the like, are contained in the processing of each valuable medium; therefore, the time period for the edge detection and the tilt correction has to be short. Moreover, since more valuable media are processed in a hardware platform such as an embedded platform, demanding requirements are also imposed on the storage space.

3. The generated image of the valuable document is deformed due to factors such as inconsistent friction coefficients in a moving process of the identification apparatus; or the generated image of the papers has trapezoid deformation due to an angle problem in a process of scanning the papers.

A common edge detection algorithm is the Hough Transform. The Hough Transform is to map the rectangular coordinate system to the polar coordinate system, for example, a straight line is represented as $y=kx+b$ in the rectangular coordinate system, and is represented as $r=x\cos(\theta)+y\sin(\theta)$ in the polar coordinate system, and any straight line in the rectangular coordinate system corresponds to a point in the polar coordinate system. When the edge detection is performed using Hough Transform, for the edge points in the image, corresponding points $(r, \theta)$ in the polar coordinate transform domain are calculated, the corresponding points in the transform domain are accumulated, and the maximally distributed points are obtained. Further, points on a straight line of an edge to be detected are further obtained, and points that are not on the edge are eliminated. Since one cosine calculation and one sine calculation are required to be performed on each point in the process of mapping, the calculation amount is large, and the calculation time is long since the calculation is floating-point calculation.

Another common edge detection algorithm is the Canny edge detection. The Canny operator is an edge detection operator based on optimization algorithm, thereby having a good signal-noise ratio and good detection accuracy. Firstly, de-noising is performed on the image by using Gaussian filtering. Then, an amplitude value and a direction of the gradient are calculated by finite difference of first-order partial derivative. Next, a non-maximum suppression is applied on the amplitude value of the gradient. Finally, the edge is detected and joined by a double-threshold algorithm. The calculation amount is large, and the calculation time is long.

Therefore, there is a need for a method that can perform edge detection and tilt correction on a fragmentary or deformed image of valuable documents, bills or papers quickly.

SUMMARY

In order to solve the problem in the prior art that the calculation time of the edge detection algorithm is long, the present disclosure provides a method for performing quick edge detection and tilt correction on a fragmentary or deformed image of valuable documents, bills or papers.

The method for correcting a fragmentary or deformed quadrangular image includes: step 1, edge point detection: where edge points are detected quickly using a grayscale value difference between an image region and a background region in a collected image, and an edge point detection is performed on each edge of the collected image in a X direction at equal intervals of $\Delta W$ based on a characteristic that the image of a valuable document is in a shape of quadrangle and the edges of the image are straight lines, a limited number of edge points are acquired and edge fitting is performed to obtain a straight line equation; step 2, abnormal edge point elimination: where abnormal points detected due to fragment, wrinkle or the like are eliminated so as to improve the accuracy of straight line fitting; statistics is performed on a slope distribution of the slopes of adjacent edge points based on a characteristic that a fragmentary edge part is smaller than a non-fragmentary edge part in the image of the valuable document, and a slope, the number of which is the largest in the slope distribution, is used as a slope of a straight line to be fitted, and edge points whose slope is not in the range of the largest slope are eliminated; step 3, straight line fitting: where a least-square fitting is performed on a point set of edge points obtained after the abnormal points are eliminated so as to obtain an edge straight line equation; step 4, vertex calculation: where fourth edge straight lines are obtained through the above three steps, and four vertexes of the quadrangle are obtained by solving intersection points of the straight lines; and step 5, image correction: where a correspondence between a point before correction and a corrected point is acquired based on a proportional relation in a bilinear space, and a tilt-corrected image of the image of the valuable document is obtained by grayscale interpolation.

Specifically, the step 1 of detecting an upper edge point includes: 1.1, searching, from up to down, for the upper edge point on a straight line x=WIDTH/2, where the edge point obtained is PointsSet_Up[index$_0$]=(x_up_index$_0$, y_up_index$_0$); 1.2, detecting an edge point on a straight line x=x_up_index$_0$−ΔW, where a searching range of y is [y_up_index$_0$−Δy, y_up_index$_0$+Δy], and the edge point searched is PointsSet_Up[index$_{-1}$]=(x_up_index$_{-1}$, y_up_index$_{-1}$); 1.3, repeating the operation in 1.2 with PointsSet_Up[index$_{-1}$] as an origin point, and performing the edge point detection until that no edge point is detected within a set searching range; 1.4, detecting an edge point on a straight line x=x_up_index$_0$+ΔW, where a searching range of y is [y_up_index$_0$−Δy, y_up_index$_0$+Δy], and the edge point searched is PointsSet_Up[index$_1$]=(x_up_index$_1$, y_up_index$_1$); 1.5, repeating the operation in 1.4 with PointsSet_Up[index$_1$] as an origin point, and performing the edge point detection until no edge point is detected in a set searching range; and 1.6, obtaining a point set of the detected upper edge points (PointsSet_Up[index$_{-lm}$], PointsSet_Up[index$_{-lm+1}$], . . . PointsSet_Up[index$_{-1}$], PointsSet_Up[index$_0$], PointsSet_Up[index$_1$], . . . PointsSet_Up[index$_{rm-1}$], PointsSet_Up[index$_{rm}$].

Specifically, the step 2 of abnormal edge point elimination includes:

2.1, slope calculation: where it is assumed that two adjacent upper edge points are PointsSet_Up[index$_{n-1}$] and PointsSet_Up[index$_n$], and a slope of the two adjacent upper edge points is $$k = \frac{\text{PointsSet\_Up}[index_n] \cdot y - \text{PointsSet\_Up}[index_{n-1}] \cdot y}{\text{PointsSet\_Up}[index_n] \cdot x - \text{PointsSet\_Up}[index_{n-1}] \cdot x},$$

since PointsSet_Up[index$_n$].x−PointsSet_Up[index$_{n-1}$].x=ΔW, therefore $$k = \frac{\text{PointsSet\_Up}[index_n] \cdot y - \text{PointsSet\_Up}[index_{n-1}] \cdot y}{\Delta W}$$

since ΔW is a constant, k is represented by ks directly when determining the slope, ks=PointsSet_Up[index$_n$].y−PointsSet_Up[index$_{n-1}$].y, k~=ks;

2.2, slope distribution statistics: where the slope distribution statistics is performed by taking a quantitative standard being 1 as an example, angles of an upper edge, a lower edge, a left edge and a right edge are generally less than 90 degrees, and it is assumed that tilt angles of the four edges in the system should be less than θ; therefore, the slope ks calculated in 2.1 is an integer, a maximum value of the slope ks is represented as ks$_{max}$, and a minimum value of the slope ks is represented as ks$_{min}$, then, $$k_{max} = \frac{ks_{max}}{\Delta W} = \tan(\theta),$$

$$k_{min} = \frac{ks_{min}}{\Delta W} = \tan(-\theta) = -\tan(\theta);$$

therefore, ks$_{max}$=[tan(θ)*ΔW], ks$_{min}$=−[tan(θ)*ΔW], where [ ] represents rounding;

accumulative statistics is performed on the ks within a range of [−[tan(θ)*ΔW], [tan(θ)*ΔW]], and then ks, the number of which is the largest in the slope distribution, is obtained; and 2.3, abnormal edge point elimination:

where based on the ks calculated in 2.2, the number of which is the largest in the slope distribution, points corresponding to ks whose number is not the largest in the slope distribution, are eliminated from the point set of the edge points, and a point set of upper edge points obtained after the abnormal points are eliminated is defined as PointsSet_Up_New.

Specifically, the step 3 of acquiring the edge straight line equation includes: assuming that an upper edge straight line equation to be solved is y=kx+b, the point set of upper edge points obtained after the abnormal points are eliminated is PointsSet_Up_New, X represents PointsSet_Up_New.x, Y represents PointsSet_Up_New.y, and n is the number of points in the PointsSet_Up_New, then $$k = \frac{n\sum XY - \sum X \sum Y}{n \sum X^2 - (\sum X)^2},$$

$$b = \frac{(\sum Y) - k(\sum X)}{n};$$

where edge straight line equations are obtained for the lower edge, the left edge and the right edge respectively in a similar way.

Specifically, the step 5 of acquiring the correspondence between the point before being corrected and the corrected point comprises: performing X displacement and Y displacement on a point in an original image in a bilinear transformation space so as to obtain a corresponding point in the corrected image, where it is assumed that four vertexes A, B, C and D are obtained through the calculation in step 4, and the corresponding points after tilt-correction are A', B', C' and D' respectively, where calculating a correspondence between a point X'(x', y') in the tilt-corrected image and a corresponding point X(x, y) in the corresponding original image comprises:

5.1, calculating the displacement in the y direction:

where the displacement of a point X' in the corrected image in the y direction is y', similarly, each of a point E' and a point F' also has a displacement y' in the y direction, and point X', point E' and point F' correspond to a point X, a point E and a point F in the original image, respectively;

coordinates of point E:

where the displacement of point E' in the y direction, i.e. the displacement of point E' on straight line A'C', corresponds to the movement of point E on straight line AC in the image before tilt correction, which is in proportion to the movement of point E' on straight line A'C';

$$x_E = x_A + \frac{y_{E'} - y_{A'}}{y_{C'} - y_{A'}} \cdot (x_C - x_A),$$

$$y_E = y_A + \frac{y_{E'} - y_{A'}}{y_{C'} - y_{A'}} \cdot (y_C - y_A)$$

i.e., [formula 1]

$$x_E = x_A + \frac{y'}{\text{Height}} \cdot (x_C - x_A)$$

$$y_E = y_A + \frac{y'}{\text{Height}} \cdot (y_C - y_A)$$

coordinates of point F:

the displacement of point F' in the y direction, i.e. the displacement of point F' on straight line B'D', corresponds to the movement of point F on straight line BD in the image before tilt correction, which is in proportion to the movement of point F' on straight line B'D', $$x_F = x_B + \frac{y_{F'} - y_{B'}}{y_{D'} - y_{B'}} \cdot (x_D - x_B)$$

$$y_F = y_B + \frac{y_{F'} - y_{B'}}{y_{D'} - y_{B'}} \cdot (y_D - y_B)$$

since the corrected image is in a shape of quadrangle, $$y_{D'} = y_{C'}, \, y_{B'} = y_{A'}, \, y_{F'} = y_{E'};$$

therefore, $$x_F = x_B + \frac{y_{E'} - y_{A'}}{y_{C'} - y_{A'}} \cdot (x_D - x_B)$$

$$y_F = y_B + \frac{y_{E'} - y_{A'}}{y_{C'} - y_{A'}} \cdot (y_D - y_B)$$

i.e., [formula 2]:

$$x_F = x_B + \frac{y'}{\text{Height}} \cdot (x_D - x_B)$$

$$y_F = y_B + \frac{y'}{\text{Height}} \cdot (y_D - y_B)$$

5.2, displacement in the x direction:

where the displacement of point X' in the corrected image in the x direction is x', and the movement of point X' in the x direction, i.e., the movement of point X' on straight line E'F', is in proportion to the movement of point X on straight line EF, coordinates of point X are obtained based on the coordinates of point E and the coordinates of point F:

$$x_X = x_E + \frac{x_{X'} - x_{E'}}{x_{B'} - x_{A'}} \cdot (x_F - x_E)$$

$$y_X = y_E + \frac{x_{X'} - x_{E'}}{x_{B'} - x_{A'}} \cdot (y_F - y_E)$$

i.e., [formula 3]:

$$x_X = x_E + \frac{x'}{\text{Width}} \cdot (x_F - x_E)$$

$$y_X = y_E + \frac{x'}{\text{Width}} \cdot (y_F - y_E)$$

the correspondence between any one point (x', y') in the corrected image and the point (x, y) in the corresponding original image is obtained according to [formula 1], [formula 2] and [formula 3].

Specifically, when acquiring the correspondence between the point before being corrected and the corrected point in step 5, a corrected image of the whole image of the valuable document is obtained if the value of x' is traversed from 0 to Width-1 and the value of y' is traversed from 0 to Height-1, and a corrected image of a partial region of interest in the valuable document is obtained if the value of x' is taken only from a part of values within a range of [0, Width] and/or the value of y' is taken only from a part of values within a range of [0, Height].

Preferably, the grayscale interpolation algorithm in step 5 comprises Nearest Neighbor Interpolation, bilinear interpolation or high-order interpolation.

The method for correcting a fragmentary or deformed quadrangular image according to the present disclosure is applied to an identification method and an identification system for valuable documents, bills or papers such as an identity card. In step 1 of the method for correcting the fragmentary or deformed quadrangular image, the edge point detection is performed quickly based on a difference between a background part and a foreground part in the collected image, thereby avoiding a complicated calculation caused by various gradient operators and reducing detection time for the edge points. Moreover, the edge point detection is performed in the image at equal intervals, thereby reducing the detection time for the edge points. In addition, since coordinates of adjacent edge points are close to each other, a next edge point can be detected using information on a previous adjacent edge point in a process of detecting the same edge, thereby narrowing a detection scope for the edge points and reducing the detection time for the edge points. A simplified calculation method is proposed to perform the slope calculation in step 2, a slope calculation with floating-point division calculation is converted into integer subtraction calculation, thereby reducing calculation complexity and reducing calculation time. Therefore, the method for correcting the fragmentary or deformed quadrangular image according to the present disclosure can perform the edge detection and the tilt correction quickly on the fragmentary or deformed image of valuable documents, bills or papers.

EXPLANATION OF PARAMETERS

WIDTH: width of the whole image
HEIGHT: height of the whole image

Width: width of image after tilt correction
Height: height of image after tilt correction
x: variable of image in a horizontal direction
y: variable of image in a vertical direction
point set of upper edge points PointsSet_Up
point set of lower edge points PointsSet_Down
point set of left edge points PointsSet_Left
point set of right edge points PointsSet_Right
upper edge straight line Line_Up
lower edge straight line Line_Down
left edge straight line Line_Left
right edge straight line Line_Right
$\Delta W$: a step interval in the x direction when upper edge points and lower edge points are detected
$\Delta y$: a floating range in the y direction when upper edge points and lower edge points are detected
$\Delta H$: a step interval in the y direction when left edge points and right edge points are detected
$\Delta x$: a floating range in the x direction when left edge points and right edge points are detected

DETAILED DESCRIPTION

In order to further describe the method for correcting the fragmentary or deformed quadrangular image according to the present disclosure, a detailed description will be given below in conjunction with a preferred embodiment of the present disclosure.

Figure 1:
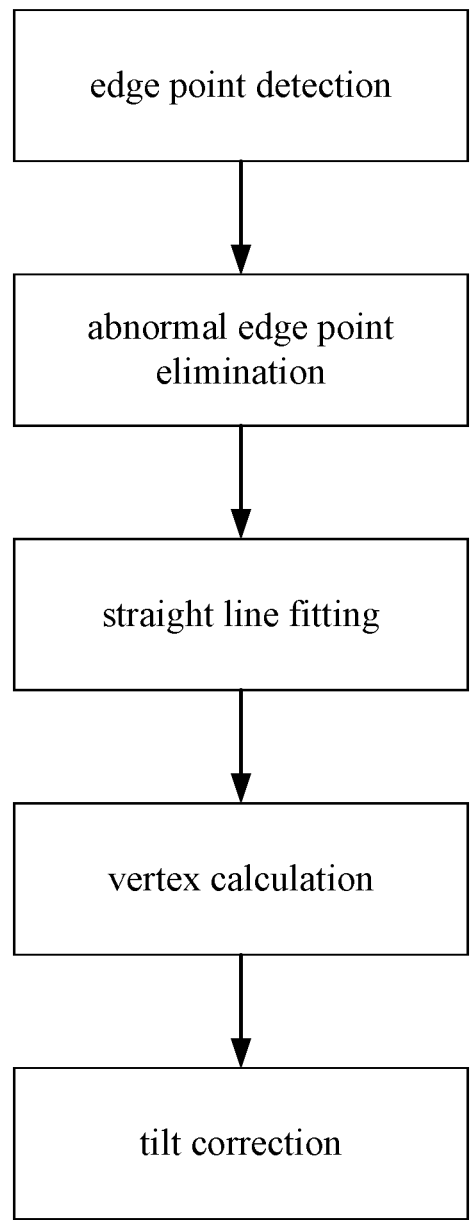
FIG. 1 is a flowchart of a method for correcting a fragmentary or deformed quadrangular image according to an embodiment of the present disclosure.

With reference to FIG. 1, which is a flow diagram of a method for correcting a fragmentary or deformed quadrangular image, the method includes five steps, i.e. edge point detection, abnormal edge point elimination, straight line fitting, vertex calculation and image correction, which will be described below in detail step by step.

Step 1: Edge Point Detection

There is a difference between grayscale values of an image region and a background region in an imaging process of valuable documents, bills or papers. With this difference, edge points of each edge of the image region can be determined quickly, which is not in the background, thereby avoiding complicated calculation caused by various gradient operators and decreasing detection time for the edge points.

In addition, since the valuable documents, the bills or the papers are of a quadrangle-like shape and the edges are straight lines, it is not required to detect all the edge points. Only a limited number of edge points are required to be detected for each edge, and then edge fitting can be performed to acquire a straight-line equation. Therefore, the edge point detection is performed on the image at equal intervals, thereby reducing the detection time for edge points.

Furthermore, since coordinates of adjacent edge points are closed to each other, a next edge point can be detected using information on a previous adjacent edge point in a process of detecting the same edge, thereby narrowing a detection scope of edge points and reducing the time for detecting edge points.

Specifically, in an example of detecting an upper edge point:

(1) an upper edge point is searched for in a straight line x=WIDTH/2 from up to down, and the obtained edge point is PointsSet_Up[index$_0$]=(x_up_index$_0$, y_up_index$_0$);

(2) an edge point is detected in a straight line x=x_up_index$_0$−$\Delta W$, a searching range of y is [y_up_index$_0$−$\Delta y$, y_up_index$_0$+$\Delta y$], and a searched edge point is PointsSet_Up[index$_{-1}$]=(x_up_index$_{-1}$, y_up_index$_{-1}$);

(3) the operation in (2) is repeated with PointsSet_Up[index$_{-1}$] as an origin point so as to perform edge point detection until no edge point is detected within a set searching range;

(4) an edge point is detected in a straight line x=x_up_index$_0$+$\Delta W$, a searching range of y is [y_up_index$_0$−$\Delta y$, y_up_index$_0$+$\Delta y$], and a searched edge point is PointsSet_Up[index$_1$]=(x_up_index$_1$, y_up_index$_1$);

(5) the operation in (4) is repeated with PointsSet_Up[index$_1$] as an origin point so as to perform edge point detection until no edge point is detected within a set searching range;

(6) a point set of the detected upper edge points is (PointsSet_Up[index$_{-lm}$], PointsSet_Up[index$_{-lm+1}$], . . . PointsSet_Up[index$_{-1}$], PointsSet_Up[index$_0$], PointsSet_Up[index$_1$], . . . PointsSet_Up[index$_{rm-1}$], PointsSet_Up[index$_{rm}$].

Step 2: Abnormal Edge Point Elimination

Figure 2:
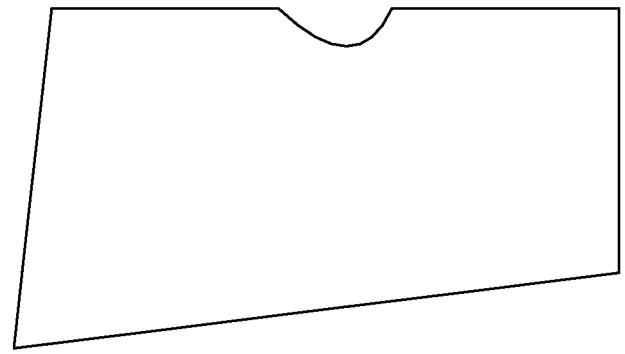
FIG. 2 is a schematic diagram of an image of which the edge is fragmentary.

The edge points detected in the image include fragmentary edge points due to fragment, wrinkle or the like in the valuable documents, the bills or the papers, as shown in FIG. 2. For this reason, not all the detected edge point sets are on one straight line, thus having an influence on fitting accuracy of subsequent edge straight lines. Therefore, before the fitting, the abnormal edge point elimination is performed.

In the embodiment, based on a characteristic that a fragmentary edge part is smaller than a non-fragmentary edge part in the image of the valuable documents, the bills or the papers, statistics is performed on a slope distribution of slopes of adjacent edge points, and a slope, the number of which is the largest in the slope distribution, is taken as the slope of a straight line to be fitted, and edge points whose slopes are not in the range of the largest slope are eliminated. Herein, in particular, slope calculation and slope distribution statistics are simplified.

Similarly, by taking the upper edge as an example, calculation is performed according to the following steps:

(1) Slope Calculation

In the edge point detection in step 1, the edge point detection is performed in the x direction at equal intervals of $\Delta W$; assuming that two adjacent upper edge points are PointsSet_Up[index$_{n-1}$] and PointsSet_Up[index$_n$], a slope of the two adjacent upper edge points $$k = \frac{\text{PointsSet\_Up}[index_n] \cdot y - \text{PointsSet\_Up}[index_{n-1}] \cdot y}{\text{PointsSet\_Up}[index_n] \cdot x - \text{PointsSet\_Up}[index_{n-1}] \cdot x};$$

since PointsSet_Up[index$_n$].x−PointsSet_Up[index$_{n-1}$].x=$\Delta W$, $$k = \frac{\text{PointsSet\_Up}[index_n] \cdot y - \text{PointsSet\_Up}[index_{n-1}] \cdot y}{\Delta W};$$

since $\Delta W$ is a constant, when estimating the slope, k is represented by ks directly, ks=PointsSet_Up[index$_n$].y−PointsSet_Up[index$_{n-1}$].y, k~=ks In this way, a slope calculation with floating-point division calculation is simplified as integer subtraction calculation.

(2) Slope Distribution Statistics

A quantitative statistics is performed on slope distribution. In an actual application, the quantitative statistics for the slope can be designed based on accuracy of solving the slope; that is, the slope distribution statistics can be performed on a slope value with a quantitative standard being 1, or with a quantitative standard being 2. In a case where the quantitative standard is 2, the distributions of two adjacent slopes are combined and a accumulative statistics is performed.

The slope distribution statistics is explained below by taking the quantitative standard being 1 as an example.

Typically, angles of an upper edge, a lower edge, a left edge and a right edge are smaller than 90 degrees. Assuming that tilt angles of the four edges in the system should be smaller than θ, the slope ks calculated in the above step (1) is therefore an integer, a maximum value of ks is represented as $ks_{max}$, and a minimum value of ks is represented as $ks_{min}$, then:

$$k_{max} = \frac{ks_{max}}{\Delta W} = \tan(\theta)$$

$$k_{min} = \frac{ks_{min}}{\Delta W} = \tan(-\theta) = -\tan(\theta)$$

therefore, $$ks_{max} = [\tan(\theta)*\Delta W]$$

$ks_{min} = -[\tan(\theta)*\Delta W]$, where [ ] represents rounding, since ks is an integer;

accumulative statistics is performed on the ks within a range of $[-[\tan(\theta)*\Delta W], [\tan(\theta)*\Delta W]]$, and then ks, the number of which is the largest in the slope distribution, is obtained;

(3) Abnormal Edge Point Elimination

As described above, in a case where an edge of the image of the valuable documents, the bills or the papers is fragmentary or the like, an edge point detected in the fragmentary part is not on the same line as the real edge, and a slope of the edge point detected in the fragmentary part is different from that of the real edge. Moreover, assuming that the fragmentary part is less than a half of the whole edge, ks, the number of which is the largest in the slope distribution can be calculated through step (2), and then points corresponding to ks whose number is not the largest in the slope distribution are eliminated from the point set of the edge points. A point set of upper edge points obtained after the abnormal points are eliminated is defined as PointsSet_Up_New.

Step 3, straight line fitting: least-square fitting is performed on the point set obtained after the abnormal points are eliminated so as to obtain a straight-line equation.

Assuming that an upper edge straight-line equation to be solved is y=kx+b, the point set of upper edge points obtained after the abnormal points are eliminated is PointsSet_Up_New, where X represents PointsSet_Up_New.x, Y represents PointsSet_Up_New.y, n is the number of points in the PointsSet_Up_New, then $$k = \frac{n\sum XY - \sum X \sum Y}{n\sum X^2 - (\sum X)^2},$$

-continued $$b = \frac{(\sum Y) - k(\sum X)}{n}.$$

Figure 3:
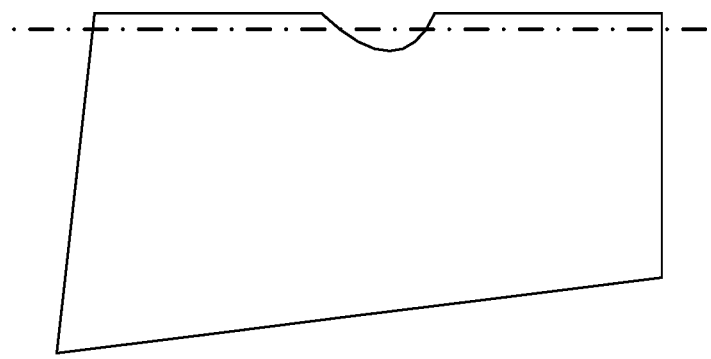
FIG. 3 is a schematic diagram of a result of edge fitting without eliminating abnormal point.
Figure 4:
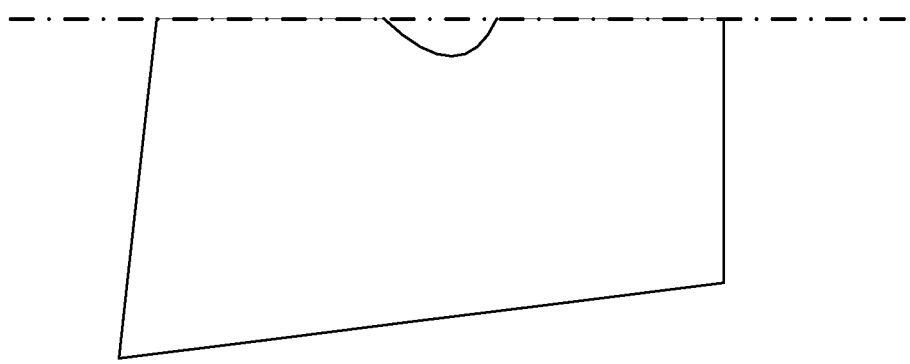
FIG. 4 is a schematic diagram of a result of edge fitting after abnormal point elimination.

Similarly, for the lower edge, the left edge and the right edge, corresponding edge straight-line equations are obtained respectively through the steps described above. As shown in FIG. 3 and FIG. 4, the effect of edge fitting before abnormal point elimination is different from the effect of edge fitting after abnormal point elimination, and the effect of edge fitting after abnormal point elimination is closer to the edge of an image which is not fragmentary or deformed.

Step 4, vertex calculation: four vertexes are obtained by solving straight lines of four edges.

Intersection points, i.e. vertexes of the quadrangle, are obtained by solving a two intersected-line equation.

Figure 5:
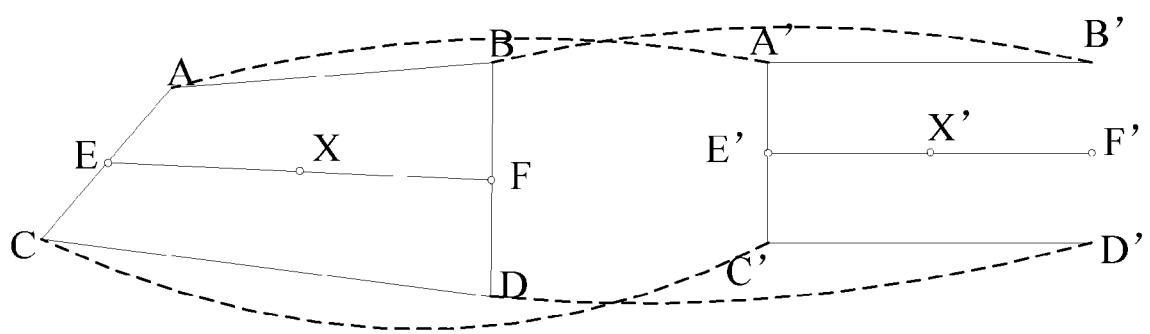
FIG. 5 is a schematic mapping diagram of image tilt correction.

An intersection point of the upper edge straight line and the left edge straight line is solved and the upper left vertex A is obtained, an intersection point of the upper edge straight line and the right edge straight line is solved and the upper right vertex B is obtained, an intersection point of the lower edge straight line and the left edge straight line is solved and the lower left vertex C is obtained, and an intersection point of the lower edge straight line and the right edge straight line is solved and the lower right vertex D is obtained, as shown in FIG. 5.

Step 5, correction image: the content of tilt-corrected image is acquired.

After the image of the valuable documents, the bills or the papers is collected, there might be a requirement for only identifying a part of the content of the valuable documents, the bills or the papers in the application. For example, only an identity card number is required to be identified when an identity card is identified. Also, only a two-dimensional code at the lower right corner of a bill has to be identified when a bill is identified.

Therefore, the tilt correction described herein can be not only applied to the whole image of the valuable documents, the bills or the papers, but also applied to a partial region of interest in the image of the valuable documents, the bills or the papers.

A process of the correction includes two steps:

(1) Calculating a Transformation Relation before the Correction and after the Correction X displacement and Y displacement are performed on a point in an original image in a bilinear transformation space to obtain a corresponding point in the corrected image.

Assuming that four vertexes A, B, C and D are obtained through the calculation in step 4, the corresponding points after tilt correction are A', B', C' and D' respectively, as shown in FIG. 5.

A correspondence between a point X'(x', y') in the tilt-corrected image and a corresponding point X(x, y) in the corresponding original image (an image before tilt correction) is calculated below.

(1.1) the Displacement in the y Direction is Firstly Calculated:

the displacement of a point X' in the corrected image in the y direction is y', similarly, each of a point E' and a point F' also has a displacement y' in the y direction, and point X', point E' and point F' correspond to a point X, a point E and a point F in the original image, respectively.

Coordinates of Point E:

The displacement of point E' in the y direction, i.e. the displacement of point E' on straight line A'C', corresponds to the movement of point E on straight line AC in the image before tilt correction, which is in proportion to the movement of point E' on straight line A'C'.

$$x_E = x_A + \frac{y_{E'} - y_{A'}}{y_{C'} - y_{A'}} \cdot (x_C - x_A),$$

$$y_E = y_A + \frac{y_{E'} - y_{A'}}{y_{C'} - y_{A'}} \cdot (y_C - y_A)$$

i.e., [formula 1]:

$$x_E = x_A + \frac{y'}{\text{Height}} \cdot (x_C - x_A)$$

$$y_E = y_A + \frac{y'}{\text{Height}} \cdot (y_C - y_A)$$

Coordinates of Point F:
the displacement of point F' in the y direction, i.e. the displacement of point F' on straight line B'D', corresponds to the movement of point F on straight line BD in the image before tilt correction, which is in proportion to the movement of point F' on straight line B'D', $$x_F = x_B + \frac{y_{F'} - y_{B'}}{y_{D'} - y_{B'}} \cdot (x_D - x_B)$$

$$y_F = y_B + \frac{y_{F'} - y_{B'}}{y_{D'} - y_{B'}} \cdot (y_D - y_B)$$

since the corrected image is in a shape of quadrangle, $y_{D'} = y_{C'}, y_{B'} = y_{A'}, y_{F'} = y_{E'}$;
therefore, $$x_F = x_B + \frac{y_{E'} - y_{A'}}{y_{C'} - y_{A'}} \cdot (x_D - x_B)$$

$$y_F = y_B + \frac{y_{E'} - y_{A'}}{y_{C'} - y_{A'}} \cdot (y_D - y_B)$$

i.e., [formula 2]:

$$x_F = x_B + \frac{y'}{\text{Height}} \cdot (x_D - x_B)$$

$$y_F = y_B + \frac{y'}{\text{Height}} \cdot (y_D - y_B)$$

(1.2) Displacement in the x Direction:
The displacement of point X' in the corrected image in the x direction is x', and the movement of point X' in the x direction, i.e., the movement of point X' on straight line E'F', is in proportion to the movement of point X on straight line EF.

Coordinates of point X are obtained based on the coordinates of point E and the coordinates of point F:

$$x_X = x_E + \frac{x_{X'} - x_{E'}}{x_{B'} - x_{A'}} \cdot (x_F - x_E)$$

$$y_X = y_E + \frac{x_{X'} - x_{E'}}{x_{B'} - x_{A'}} \cdot (y_F - y_E)$$

i.e., [formula 3]:

$$x_X = x_E + \frac{x'}{\text{Width}} \cdot (x_F - x_E)$$

$$y_X = y_E + \frac{x'}{\text{Width}} \cdot (y_F - y_E)$$

In this way, the correspondence between any one point (x', y') in the corrected image and the point (x, y) in the corresponding original image is obtained according to [formula 1], [formula 2] and [formula 3].

A corrected image of the whole image of the valuable documents, the bills or the papers is obtained if the value of x' is traversed from 0 to Width−1 and the value of y' is traversed from 0 to Height−1, and a corrected image of a partial region of interest in the valuable documents, the bills or the papers is obtained if the value of x' is taken only from a part of values within a range of [0, Width] or the value of y' is taken only from a part of values within a range of [0, Height]. Value ranges of x' and y' can be set based on actual requirements in the application.

(2) Grayscale Interpolation

After the correspondence between the point before tilt correction and the point after tilt correction is obtained, a grayscale interpolation algorithm is further required for acquiring a final corrected image so that the corrected image has good continuity and consistency. A specific interpolation method includes the Nearest Neighbor Interpolation, the bilinear interpolation, the high-order interpolation or the like. In terms of the time for calculation, the Nearest Neighbor Interpolation has the shortest time, the bilinear interpolation has a longer time, and the high-order interpolation has the longest time. In terms of the smoothness after interpolation, the high-order interpolation is the best, the bilinear interpolation is less good, and the Nearest Neighbor Interpolation is the worst. An interpolation method can be selected based on actual identification requirements in the application.

The method for correcting the fragmentary or deformed quadrangular image according to the embodiment is applied to the identification technology for a document such as valuable documents, bills or papers and improves the speed and accuracy in identification.

The above described are only preferred embodiments of the present disclosure, it should be noted that the preferred embodiments described above should not regarded as limiting the present disclosure, and the scope of protection of the present disclosure is in accordance with the scope defined by the appended claims. Many improvements and modifications can also be made by those skilled in the art without departing from the sprit and scope of the present disclosure, and such improvements and modifications will also fall within the scope of protection of the present disclosure.

The invention claimed is:

1. A method for correcting a fragmentary or deformed quadrangular image, comprising:
    step 1, edge point detection: wherein edge points are detected quickly using a grayscale value difference between an image region and a background region in a collected image, and an edge point detection is performed on each edge of the collected image in a X direction at equal intervals of ΔW based on a characteristic that the image of a valuable document is in a shape of quadrangle and the edges of the image are straight lines, a limited number of edge points are acquired, and edge fitting is performed to obtain a straight line equation;

step 2, abnormal edge point elimination: wherein a detected abnormal point due to fragment, wrinkle is eliminated to improve the accuracy of straight line fitting; statistics is performed on a slope distribution of the slopes of adjacent edge points based on a characteristic that a fragmentary edge part is smaller than a non-fragmentary edge part in the image of the valuable document, and a slope, the number of which is the largest in the slope distribution, is used as a slope of a straight line to be fitted, and edge points whose slopes are not in the range of the largest slope are eliminated;

step 3, straight line fitting: wherein a least-square fitting is performed on a point set of edge points obtained after the abnormal points are eliminated, to obtain an edge straight line equation;

step 4, vertex calculation: wherein fourth edge straight lines are obtained through the above three steps, and four vertexes of the quadrangle are obtained by solving intersection points of the fourth straight lines; and step 5, image correction: wherein a correspondence between a point before correction and a corrected point is acquired based on a proportional relation in a bilinear space, and a tilt-corrected image of the image of the valuable document is obtained by grayscale interpolation.

2. The method for correcting the fragmentary or deformed quadrangular image according to claim 1, wherein the step 1 of detecting an upper edge point comprises:

1.1, searching, from up to down, for the upper edge point on a straight line x=WIDTH/2, wherein a obtained edge point is PointsSet_Up[$index_0$]=(x_up_$index_0$, y_up_$index_0$);

1.2, detecting an edge point on a straight line x=x_up_$index_0$−$\Delta W$, wherein a searching range of y is [y_up_$index_0$−$\Delta y$, y_up_$index_0$+$\Delta y$], and the edge point searched is PointsSet_Up[$index_{-1}$]=(x_up_$index_{-1}$, y_up_$index_{-1}$);

1.3, repeating the operation in 1.2 with PointsSet_Up[$index_{-1}$] as an origin point, and performing the edge point detection until no edge point is detected in a set searching range;

1.4, detecting an edge point on a straight line x=x_up_$index_0$+$\Delta W$, wherein a searching range of y is [y_up_$index_0$−$\Delta y$, y_up_$index_0$+$\Delta y$], and the edge point searched is PointsSet_Up[$index_1$]=(x_up_$index_1$, y_up_$index_1$);

1.5, repeating the operation in 1.4 with PointsSet_Up[$index_1$] as an origin point, and performing the edge point detection until no edge point is detected in a set searching range; and 1.6, obtaining a point set of the detected upper edge points (PointsSet_Up[$index_{-lm}$], PointsSet_Up[$index_{-lm+1}$], ... PointsSet_Up[$index_{-1}$], PointsSet_Up[$index_0$], PointsSet_Up[$index_1$], ... PointsSet_Up[$index_{rm-1}$], PointsSet_Up[$index_{rm}$].

3. The method for correcting the fragmentary or deformed quadrangular image according to claim 2, wherein the step 2 of the abnormal point elimination comprises:

2.1, slope calculation: wherein it is assumed that two adjacent upper edge points are PointsSet_Up[$index_{n-1}$] and PointsSet_Up[$index_n$], and a slope of the two adjacent upper edge points is:

$$k = \frac{\text{PointsSet\_Up}[index_n] \cdot y - \text{PointsSet\_Up}[index_{n-1}] \cdot y}{\text{PointsSet\_Up}[index_n] \cdot x - \text{PointsSet\_Up}[index_{n-1}] \cdot x},$$

$$\text{PointsSet\_Up}[index_n] \cdot x - \text{PointsSet\_Up}[index_{n-1}] \cdot x = \Delta W,$$

$$k = \frac{\text{PointsSet\_Up}[index_n] \cdot y - \text{PointsSet\_Up}[index_{n-1}] \cdot y}{\Delta W}$$

$\Delta W$ is a constant, and k is represented by ks directly when the slope is estimated, $ks$=PointsSet_Up[$index_n$].y−PointsSet_Up[$index_{n-1}$].y $k\sim=ks$ 2.2, slope distribution statistics: wherein the slope distribution statistics is performed by taking a quantitative standard being 1 as an example, angles of an upper edge, a lower edge, a left edge and a right edge are generally less than 90 degrees, and it is assumed that tilt angles of the four edges in the system are less than $\theta$; the slope ks calculated in 2.1 is an integer, a maximum value of the slope ks is represented as $ks_{max}$, and a minimum value of the slope ks is represented as $ks_{min}$, then $$k_{max} = \frac{ks_{max}}{\Delta W} = \tan(\theta),$$

$$k_{min} = \frac{ks_{min}}{\Delta W} = \tan(-\theta) = -\tan(\theta);$$

therefore, $ks_{max}$=[$\tan(\theta)*\Delta W$], $ks_{min}$=−[$\tan(\theta)*\Delta W$], where [ ] represents rounding;

accumulative statistics is performed on the ks within a range of [−[$\tan(\theta)*\Delta W$],[$\tan(\theta)*\Delta W$]], and then ks, the number of which is the largest in the slope distribution, is obtained; and 2.3, abnormal edge point elimination:

wherein based on the ks calculated in 2.2, the number of which is the largest in the slope distribution, points corresponding to ks whose number is not the largest in the slope distribution are eliminated from the point set of the edge points, and a point set of upper edge points obtained after the abnormal points are eliminated is defined as PointsSet_Up_New.

4. The method for correcting the fragmentary or deformed quadrangular image according to claim 3, wherein the step 3 of acquiring the edge straight line equation comprises:

assuming that an upper edge straight line equation to be solved is y=kx+b, the point set of upper edge points obtained after the abnormal points are eliminated is PointsSet_Up_New, X represents PointsSet_Up_New.x, Y represents PointsSet_Up_New.y, and n is the number of points in the PointsSet_Up_New, then $$k = \frac{n\sum XY - \sum X \sum Y}{n\sum X^2 - (\sum X)^2},$$

$$b = \frac{(\sum Y) - k(\sum X)}{n};$$

wherein edge straight line equations are obtained for the lower edge, the left edge and the right edge respectively in a similar way.

5. The method for correcting the fragmentary or deformed quadrangular image according to claim 4, wherein the step 5 of acquiring the correspondence between the point before being corrected and the corrected point comprises:
performing X displacement and Y displacement on a point in an original image in a bilinear transformation space, to obtain a corresponding point in the corrected image, wherein it is assumed that four vertexes A, B, C and D are obtained through the calculation in step 4, and the corresponding points after tilt-correction are A', B', C' and D' respectively, wherein calculating a correspondence between a point X'(x', y') in the tilt-corrected image and a corresponding point X(x, y) in the original image corresponding to the tilt-corrected image comprises:

5.1, calculating the displacement in the y direction:
wherein the displacement of a point X' in the corrected image in the y direction is y', similarly, each of a point E' and a point F' also has a displacement y' in the y direction, and point X', point E' and point F' correspond to a point X, a point E and a point F in the original image, respectively;

coordinates of point E:
wherein the displacement of point E' in the y direction, i.e. the displacement of point E' on straight line A'C', corresponds to the movement of point E on straight line AC in the image before tilt correction, which is in proportion to the movement of point E' on straight line A' C';

$$x_E = x_A + \frac{y_{E'} - y_{A'}}{y_{C'} - y_{A'}} \cdot (x_C - x_A)$$

$$y_E = y_A + \frac{y_{E'} - y_{A'}}{y_{C'} - y_{A'}} \cdot (y_C - y_A)$$

to obtain a formula 1

$$x_E = x_A + \frac{y'}{\text{Height}} \cdot (x_C - x_A)$$

$$y_E = y_A + \frac{y'}{\text{Height}} \cdot (y_C - y_A)$$

coordinates of point F:
the displacement of point F' in the y direction, i.e. the displacement of point F' on straight line B'D', corresponds to the movement of point F on straight line BD in the image before tilt correction, which is in proportion to the movement of point F' on straight line B'D', $$x_F = x_B + \frac{y_{F'} - y_{B'}}{y_{D'} - y_{B'}} \cdot (x_D - x_B)$$

$$y_F = y_B + \frac{y_{F'} - y_{B'}}{y_{D'} - y_{B'}} \cdot (y_D - y_B)$$

the corrected image is in a shape of quadrangle, $y_{D'} = y_{C'}, y_{B'} = y_{A'}, y_{F'} = y_{E'}$ therefore, $$x_F = x_B + \frac{y_{E'} - y_{A'}}{y_{C'} - y_{A'}} \cdot (x_D - x_B)$$

$$y_F = y_B + \frac{y_{E'} - y_{A'}}{y_{C'} - y_{A'}} \cdot (y_D - y_B)$$

to obtain a formula 2:

$$x_F = x_B + \frac{y'}{\text{Height}} \cdot (x_D - x_B)$$

$$y_F = y_B + \frac{y'}{\text{Height}} \cdot (y_D - y_B)$$

5.2, displacement in the x direction:
wherein the displacement of point X' in the corrected image in the x direction is x', and the movement of point X' in the x direction, i.e., the movement of point X' on straight line E'F', is in proportion to the movement of point X on straight line EF, coordinates of point X are obtained based on the coordinates of point E and the coordinates of point F:

$$x_X = x_E + \frac{x_{X'} - x_{E'}}{x_{B'} - x_{A'}} \cdot (x_F - x_E)$$

$$y_X = y_E + \frac{x_{X'} - x_{E'}}{x_{B'} - x_{A'}} \cdot (y_F - y_E)$$

to obtain a formula 3:

$$x_X = x_E + \frac{x'}{\text{Width}} \cdot (x_F - x_E)$$

$$y_X = y_E + \frac{x'}{\text{Width}} \cdot (y_F - y_E)$$

the correspondence between any one point (x', y') in the corrected image and the point (x, y) in the corresponding original image is obtained according to [formula 1], [formula 2] and [formula 3].

6. The method for correcting the fragmentary or deformed quadrangular image according to claim 5, wherein in the step 5 of acquiring the correspondence between the point before being corrected and the corrected point, a corrected image of the whole image of the valuable document is obtained if the value of x' is traversed from 0 to Width−1 and the value of y' is traversed from 0 to Height−1, and a corrected image of a partial region of interest in the valuable document is obtained if the value of x' is taken only from a part of values within a range of [0, Width] and/or the value of y' is taken only from a part of values within a range of [0, Height].

7. The method for correcting the fragmentary or deformed quadrangular image according to claim 4, wherein the grayscale interpolation algorithm in the step 5 comprises Nearest Neighbor Interpolation, bilinear interpolation or high-order interpolation.

8. The method for correcting the fragmentary or deformed quadrangular image according to claim 5, wherein the grayscale interpolation algorithm in the step 5 comprises Nearest Neighbor Interpolation, bilinear interpolation or high-order interpolation.

9. The method for correcting the fragmentary or deformed quadrangular image according to claim 6, wherein the grayscale interpolation algorithm in the step 5 comprises Nearest Neighbor Interpolation, bilinear interpolation or high-order interpolation.

\* \* \* \* \*